(12) United States Patent
Bruins et al.

(10) Patent No.: US 8,965,353 B2
(45) Date of Patent: Feb. 24, 2015

(54) WIRELESS LOCATION OPTIMIZATION

(71) Applicant: Apple Inc., Cupertino, CA (US)

(72) Inventors: Jay N. Bruins, Los Altos, CA (US);
Paul H. Gleichauf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 19 days.

(21) Appl. No.: 13/777,247

(22) Filed: Feb. 26, 2013

(65) Prior Publication Data
US 2014/0242961 A1     Aug. 28, 2014

(51) Int. Cl.
| | |
|---|---|
| *H04M 3/00* | (2006.01) |
| *H04W 64/00* | (2009.01) |
| *H04W 4/00* | (2009.01) |
| *H04W 4/02* | (2009.01) |

(52) U.S. Cl.
CPC .............. *H04W 64/00* (2013.01); *H04W 4/001* (2013.01); *H04W 4/02* (2013.01)
USPC ...................... 455/418; 455/456.1; 455/456.6; 455/457

(58) Field of Classification Search
USPC ............. 455/456.1, 456.6, 457; 701/117, 201
See application file for complete search history.

(56) References Cited

U.S. PATENT DOCUMENTS

| | | | |
|---|---|---|---|
| 7,412,234 | B2 | 8/2008 | Zellner |
| 8,259,652 | B2 * | 9/2012 | Huang et al. .................. 370/328 |
| 2009/0186633 | A1 * | 7/2009 | Yonker et al. .............. 455/456.6 |
| 2009/0210148 | A1 | 8/2009 | Jayanthi |
| 2010/0134279 | A1 | 6/2010 | Schwartz |
| 2010/0153001 | A1 * | 6/2010 | Bauchot et al. ............... 701/201 |
| 2010/0190510 | A1 | 7/2010 | Marahas |
| 2011/0039579 | A1 | 2/2011 | Karjalainen |
| 2011/0153629 | A1 * | 6/2011 | Lehmann et al. ............. 707/758 |
| 2012/0009951 | A1 * | 1/2012 | Poland .......................... 455/457 |
| 2012/0010806 | A1 | 1/2012 | Tseng |
| 2012/0115501 | A1 | 5/2012 | Zheng |
| 2013/0179058 | A1 * | 7/2013 | Smith ........................... 701/117 |

OTHER PUBLICATIONS

International Search Report and Written Opinion mailed Jul. 2, 2014 in PCT/US2014/015637, 10 pages.

* cited by examiner

*Primary Examiner* — David Q Nguyen
(74) *Attorney, Agent, or Firm* — Kilpatrick Townsend & Stockton LLP (57) ABSTRACT

Systems and methods are provided for configuring settings of a mobile device based on an inferred location. The mobile device can use stored indicia of trip (e.g., an electronic ticket or itinerary) to identify origination and destination locations. The start and end of the trip can be inferred based on changes in operation of the mobile device. For instance, if the user is on an airplane, the user may turn off network connectivity at the origination location just prior to takeoff, and may turn the network connectivity back on upon landing at the destination location. If the time that elapsed between the changes in operation is consistent with the duration of the trip indicated by the stored indicia, the mobile device can infer that the current location is the destination location. The mobile device can then configure location-specific settings in accordance with the destination location to establish a network connection.

21 Claims, 6 Drawing Sheets

WIRELESS LOCATION OPTIMIZATION

BACKGROUND

The present disclosure is generally related to configuring settings of a mobile device, and more particularly to configuring settings of a mobile device based on an inferred location.

Many mobile devices (e.g., smartphones) have communication settings that must be configured based on the location of the device. For instance, different countries may utilize different cellular communication standards (e.g., GSM, CDMA, etc.). Many countries also have specific frequency and power requirements for wireless communication (e.g., via a cellular network, WiFi, BlueTooth, etc.). Moreover, in some countries, regulations require that certain mobile device capabilities (e.g., GPS, camera, etc.) be deactivated. Thus, for a mobile device to connect to and communicate with a wireless network, the mobile device must determine country-specific requirements and configure its communication settings accordingly.

When a user of a mobile device arrives at a new location (e.g., upon landing at a foreign airport), there can be significant delays associated with turning on and connecting the mobile device to a network. Such delays are in part caused by the mobile device having to scan for a carrier network, identify and connect to the network, and exchange data with the network to establish its location and to deduce country-specific operating modes. If the user is one of many passengers on a large airplane, these delays can be compounded by the many passengers using bandwidth in an attempt to connect to the network at the same time.

Therefore, it is desirable to provide methods and systems for determining the location of a mobile device and configuring location-specific settings in a more reliable and efficient manner.

BRIEF SUMMARY

Embodiments can provide systems and methods for configuring settings of a mobile device based on an inferred location. The mobile device can use stored indicia of trip (e.g., an electronic ticket, itinerary, calendar entry, e-mail, SMS, etc.) to identify an origination location and destination location of the trip. The start and end of the trip can be inferred based on changes in operation of the mobile device. For instance, if the user is on an airplane, the user may turn off network connectivity (e.g., activate airplane mode) at the origination location just prior to take-off. Upon landing at the destination location, the user may turn the network connectivity back on. Based on the changes in operation, the mobile device can identify the destination location as the current location of the mobile device. For instance, if the duration of time that elapsed between turning the network connectivity off and then back on is approximately equal to the duration of time associated with the trip as indicated by the stored indicia, the mobile device can infer that the destination location is the current location of the mobile device. Upon identifying the current location, the mobile device can determine the location-specific communication settings (e.g., by retrieving the settings for the destination location from a stored data table), and can configure its communication settings accordingly to establish a network connection.

According to one embodiment, a method configures one or more settings of a mobile device of a user based on an inferred location. The mobile device analyzes data stored in a storage of the mobile device to identify indicia of an origination location and a destination location of a trip by the user. A start of the trip at the origination location is inferred based on a first change in operation of the mobile device. The first change in operation involves a change in connectivity at a network interface of the mobile device. An end of the trip at the destination location is inferred based on a second change in operation of the mobile device. After inferring the end of the trip, the destination location is identified as the current location of the mobile device, and the one or more settings of the mobile device are configured based on the identified current location. The one or more configured settings are used to establish a network connection.

Other embodiments are directed to systems, mobile devices, and computer readable media associated with methods described herein.

DETAILED DESCRIPTION

When a user of a mobile device (e.g., a smartphone) arrives at a new location (e.g., upon landing at a foreign airport), there can be significant delays associated with turning on and connecting the mobile device to a network at the new location. In the case of air travel, the communication settings of the user's mobile device will most likely be configured for communication with the networks (e.g., cellular, WiFi, etc.) with which the mobile device was most recently connected to. Thus, upon powering on the mobile device or turning on network connectivity at the new location, the mobile device may attempt to connect to a network using frequencies are other settings that are not used by networks at the new location. After failing to locate and connect to a network using the last known communication settings, the mobile device may begin sweeping other frequencies until a network is found. Upon locating and connecting to the network, the mobile device may be provided with location-specific requirements and operating modes. For instance, the network may provide the mobile device with communication standards (e.g., GSM, CDMA, etc.), specific frequency and power requirements, a country code, a time zone, device capability restrictions (e.g., relating to GPS, integrated cameras, etc.), and the like. Consequently, the process of locating and connecting to a network upon arriving at a new location can be very time consuming.

If the user is one of many passengers on a large airplane, these delays can be compounded by the many passengers using bandwidth in an attempt to connect to the network at the same time. Embodiments can address such problems.

The mobile device can used stored indicia of trip (e.g., an electronic ticket, itinerary, calendar entry, e-mail, SMS, etc.) to identify an origination location and destination location of the trip. The start and end of the trip can be inferred based on changes in operation of the mobile device. For instance, if the user is on an airplane, the user may turn off network connectivity (e.g., activate airplane mode) at the origination location just prior to take-off. Upon landing at the destination location, the user may turn the network connectivity back on (e.g., deactivate airplane mode). Based on the changes in operation, the mobile device can identify the destination location as the current location of the mobile device. For instance, if the duration of time that elapsed between turning the network connectivity off and then back on is approximately equal to the duration of time associated with the trip as indicated by the stored indicia, the mobile device can infer that the destination location is the current location of the mobile device. Upon identifying the current location, the mobile device can configure its settings accordingly to establish a network connection.

I. Introduction

As described above, a mobile device (e.g., a smartphone) can store indicia of a trip that can be used in conjunction with changes in operation of the mobile device to infer that the trip has occurred, and thus that the current location of the mobile device is the destination location of the trip. Upon inferring the current location, the communication settings of the mobile device can be configured accordingly and location-specific requirements and operating modes determined. By determining location-specific settings ahead of time, the time required for the mobile device to locate, connect to, and communicate with the network can be significantly reduced.

Figure 1:
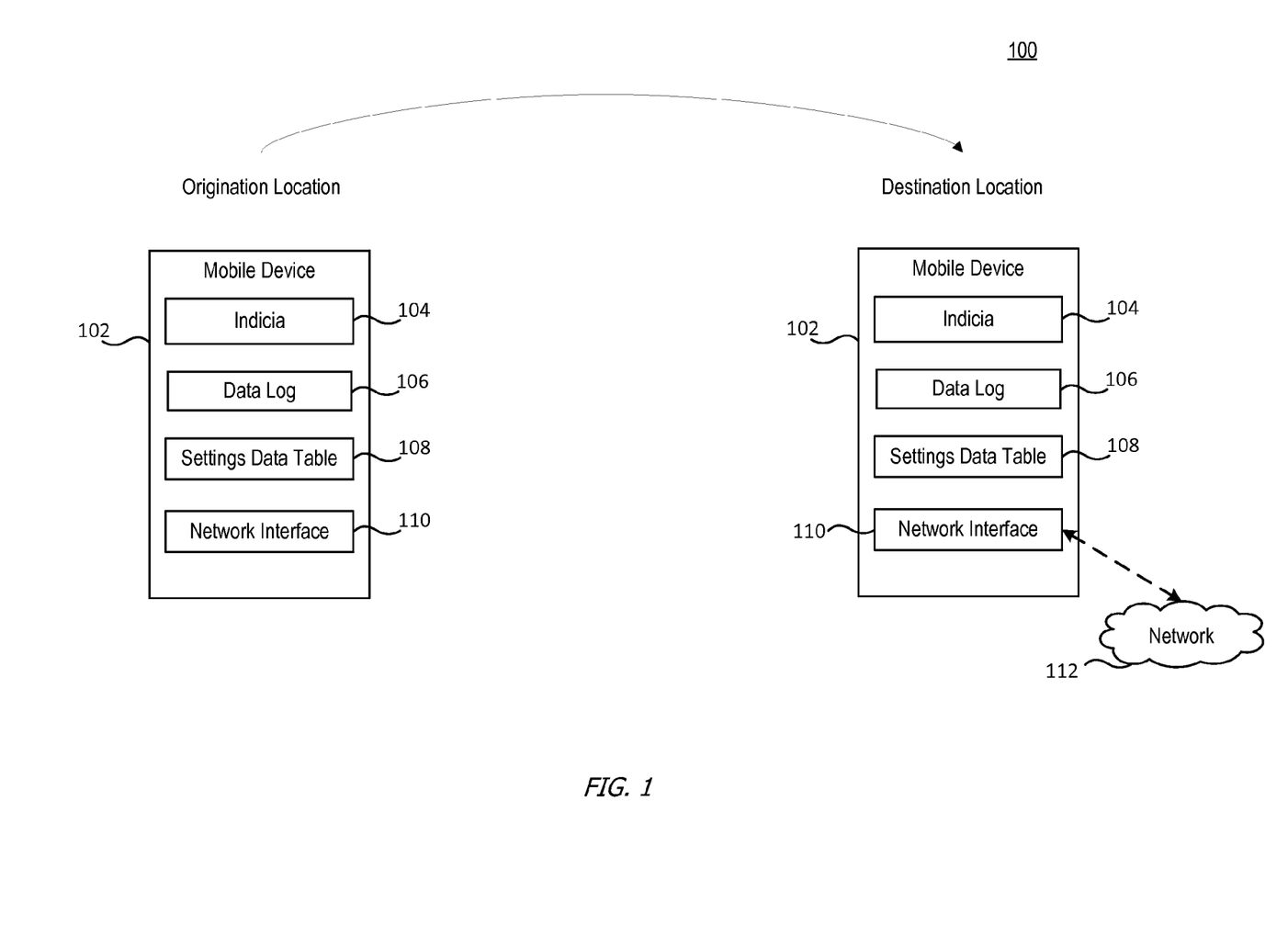
FIG. 1 is a diagram 100 showing a mobile device that can configure one or more settings based on an inferred location according to embodiments of the present invention.

FIG. 1 is a diagram 100 showing a mobile device 102 that can configure settings based on an inferred location according to embodiments of the present invention. As shown in FIG. 1, mobile device 102 can store indicia 104 of a trip by a user of the mobile. For instance, the indicia 104 can include an electronic ticket or itinerary for a trip including the date of the trip, origination location (e.g., an origination airport), destination location (e.g., a destination airport), the time of departure, the time of arrival, the duration of the flight, and other information about the trip. The stored indicia 104 can also include a calendar entry in some embodiments. For instance, the user may create a calendar entry for the trip using a calendar application on mobile device 102. As with an electronic itinerary or ticket, the calendar entry may provide any suitable information about the trip.

In some embodiments, the stored indicia 104 may include message-based data such as an e-mail message, text message, and the like. For instance, the user may have received an e-mail confirmation or receipt for the trip, and this e-mail may be stored on mobile device 102. The message-based data may also include communications between the user and another person regarding the trip. For instance, as part of an SMS text message conversation with a colleague regarding the user's trip, the user may send a message stating "My flight is scheduled to arrive in Paris tomorrow at 5 pm." Such communications may be stored on mobile device 102 and may provide any suitable information about the user's trip.

Mobile device 102 may also include a data log 106 which may be used to record changes in operation of mobile device 102. In some embodiments, as described in further detail below, mobile device 102 may write an entry into data log 106 in response to the mobile device 102 being powered off or on, and in response to the network connectivity of mobile device 102 being turned off or on (e.g., activating/deactivating an airplane mode of mobile device 102). In some embodiments, data log 106 may include entries relating to other changes in operation of mobile device 102. For instance, if mobile device 102 includes an accelerometer or altimeter (not shown), data log 106 may include accelerometer data describing velocity changes experienced by mobile device 102 or altimeter data describing altitude changes of mobile device 102. If mobile device 102 includes a barometer, changes in barometric pressure can also be written to data log 106.

As shown in FIG. 1, mobile device 102 may further include a settings data table 108 which may store various location-specific communication settings. In some embodiments, settings data table 108 may include a list of airports, country codes, time zones, communication standards (e.g., GSM, CDMA, etc.), allowed frequencies and power requirements for various network types (e.g., cellular, WiFi, BlueTooth, etc.), location-specific device capability restrictions (e.g., relating to GPS, integrated cameras, etc.), and the like. As described in further detail below, settings data table 108, data log 106, and stored indicia 104 can each be stored in a storage (e.g., a memory) of mobile device 102.

Mobile device 102 may also include a network interface 110 which may provide voice and/or data communication capability for mobile device 102. For instance, network interface 110 may provide mobile device 102 with the capability of communication with a cellular network, WiFi network, BlueTooth network, or any other suitable data network. In some embodiments, network interface 110 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof) and/or other components. In some embodiments, network interface 110 can provide wired network connectivity (e.g., Ethernet) in addition to or instead of a wireless interface. Network interface 110 can be implemented using a combination of hardware (e.g., antennas, modulators/demodulators, encoders/decoders, and other analog and/or digital signal processing circuits) and software components.

As shown in FIG. 1, mobile device 102 may transition from an origination location to a destination location. For instance, a user of the mobile device may be on a flight that departs an origination airport and arrives at a destination airport. Upon arrival, the user may want to connect to a network 112 using mobile device 102. As described in further detail below, in embodiments of the invention, mobile device 102 can utilize the stored indicia 104 of the trip in combination with the changes in operation of mobile device 102 (and other information) stored in data log 106 to infer that the current location of mobile device 102 is the destination location of the trip. Upon inferring the current location, mobile device 102 can access settings data table 108 to look up the location-specific settings for the destination location, and can configure its network communication settings and other location-specific settings accordingly prior to establishing communication with network 112.

II. Method

Figure 2:
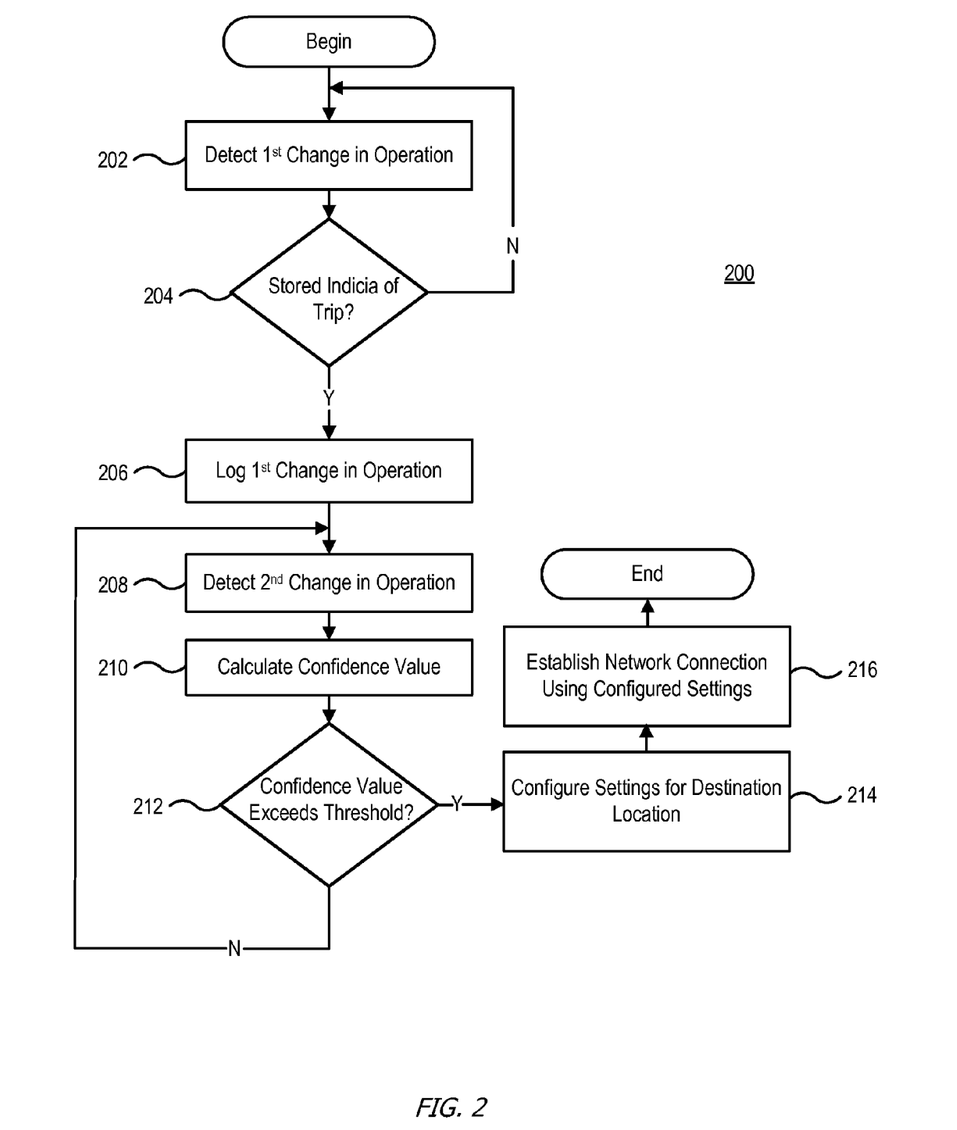
FIG. 2 is a flowchart illustrating a method 200 for configuring one or more settings of a mobile device based on an inferred location according to embodiments of the present invention.

FIG. 2 is a flowchart illustrating a method 200 for configuring one or more settings of a mobile device based on an inferred location according to embodiments of the present invention. Method 200 may be performed wholly or partially by a processor of the mobile device. An application being executed on the processor may provide instructions for performing method 200.

At block 202, the mobile device can detect a first change in operation of the mobile device. The first change in operation may involve the user turning the power of the mobile device off. In some embodiments, the first change in operation of the mobile device may by a change in connectivity of the network interface of the mobile device. For instance, the user may activate an "airplane mode" which turns off network connectivity at the network interface just prior to takeoff.

At decision 204, the mobile device can determine whether there is stored indicia of a trip by the user, and if so, whether the trip by the user has likely begun. For instance, the mobile device may analyze text and/or metadata included in a stored electronic ticket, itinerary, or calendar entry, or included in message-based data such as an e-mail or text message. At decision 204, the mobile device may look for information such as a date of the trip, an origination location (e.g., an origination airport), a destination location (e.g., a destination airport), a time of departure, a time of arrival, a flight duration, and other information about the user's trip.

If, at decision 204, the mobile device is unable to locate stored indicia of a trip, the mobile device may return to the start of method 200. Further, in some embodiments, the mobile device may return to the start of method 200 even if indicia of a trip is identified. For instance, if the date or time of the first change in operation of the mobile device detected at block 202 is inconsistent with the departure date or time for the trip included in the stored indicia, the mobile device may determine that the start of the trip has not occurred. Similarly, if the origination location for the trip included in the stored indicia is inconsistent with a location of the mobile device detected (e.g., via GPS) just prior to detecting the first change in operation, the mobile device may determine that the trip has not begun. For instance, if the mobile device identifies an electronic itinerary indicating that the user is scheduled to depart from San Francisco International Airport, but further determines that the user was located in San Diego, Calif. ten minutes prior to the first change in operation of the mobile device, the device can determine that the trip has not started due to cancellation or delay.

In some embodiments, to determine whether the user's trip has begun, the mobile device may determine whether a location of the mobile device detected just prior to the first change in operation is within a threshold distance from the origination location included in the stored indicia. If the mobile device determines at decision 204 that there is stored indicia of a trip by the user, and that the trip has likely begun, method 200 can proceed to block 206.

At block 206, the mobile device can log the first change in operation of the mobile device by writing an entry in the data log. The entry may include the time that the first change in operation occurred. At block 206, the mobile device may also record additional data in the data log. For instance, the mobile device may log data describing the last known location of the mobile device detected just prior to the first change in operation. The mobile device may also log accelerometer, altimeter, or barometric data collected prior to or shortly after the first change in operation.

It should be noted that in embodiments of the invention, blocks 202-204 (i.e. detecting the first change in operation, identifying stored indicia, and logging the first change in operation) can occur before or after the first change in operation of the mobile device is completed. For instance, if the first change in operation involves the user turning the power of the mobile device off, one or more of blocks 202-204 may occur as part of a power-down process, or may occur in some embodiments as part of the power-up process that occurs when the user turns the power of the mobile device back on at a later time. Similarly, in the case of the user turning the network connectivity off but leaving the power of the mobile device on, blocks 202-204 can be performed before or after the connectivity is actually turned off. For instance, upon turning the network connectivity off, the mobile device can set a flag or other indicator causing the mobile device to perform any of blocks 202-204 upon turning the network connectivity back on at a later time.

At block 208, the mobile device can detects a second change in operation of the mobile device. In some embodiments, at block 208, the user may turn the power of the mobile device back on, or may turn on connectivity at the network interface of the mobile device. For instance, the user may turn the airplane mode of the mobile device off upon landing at the destination airport. The mobile device may log the second change in operation by writing an entry in the data log, and in some embodiments, may record additional data such as accelerometer, altimeter, or barometric data collected prior to or following the second change in operation of the mobile device.

It should be noted that the first and second changes in operation of the mobile device (i.e. blocks 202 and 206) may each involve multiple changes in operation. For instance, any combination of turning the power off, turning the power on, turning the network connectivity off, turning the network connectivity on, or other change in operation can be interpreted as a single change in operation by the mobile device in various embodiments of the invention.

At block 210, the mobile device can calculate a confidence value reflecting the likelihood that the trip has ended, and thus that the current location of the mobile device is the destination location reflected by the stored indicia. The confidence value can be calculated in a number of different ways and based on a number of different factors according to embodiments of the invention. In some embodiments, the mobile device may compare the duration of the trip as evidenced by the stored indicia to the duration of time that passed between the first and second changes in operation of the mobile device. For instance, the mobile device may access the data log to calculate the time interval between the first and second logged changes in operation of the mobile device, and may compare this time interval to that indicated by (or calculated from) the stored indicia of the trip. Mobile device users often turn their mobile device (or network connectivity) off upon takeoff and back on upon landing. Moreover, a flight delay would merely shift the flight time as opposed to changing the flight duration. Thus, a determination that the time intervals are approximately equal may suggest a high likelihood that the trip has ended and that the mobile device is currently located at the destination location.

The mobile device, at block 210, may also consider the source of the indicia of the trip to calculate the confidence value. For instance, an electronic ticket or itinerary may be considered a more reliable source of information than a calendar entry or message-based data. Similarly, a calendar entry may be considered more reliable than message message-based data. Thus, in some embodiments, the source of the of indicia of the trip may affect the overall confidence value calculated at block 210.

The mobile device may further consider other information in calculating the confidence value. Such information may include location data, accelerometer data, altimeter data, barometer data, and the like stored in the data log. For instance, location data indicating that the user was located at the origination airport just prior to the first change in operation of the mobile device may provide evidence that the detected first change in operation is an accurate time marker for the start of the trip. Similarly, changes in acceleration, altitude, and barometric pressure logged around the time of the first and/or second changes in operation of the mobile device may further increase the confidence value. In some embodiments, other data may be detected and logged during the trip. For instance, if the mobile device receives GPS data at any point between takeoff and landing, this data can be logged and used to calculate the confidence value.

The various factors described above may be weighted, and at block 210, a formula or algorithm may be applied to one or more of the weighted factors to generate the confidence value. Upon calculation of the confidence value, method 200 can proceed to decision 212.

At decision 212, the mobile device can determine whether the calculated confidence value exceeds a threshold value. If the confidence value does not exceed the threshold value, the mobile device may determine that the trip has not ended, and thus that the mobile device is not located at the destination location. For instance, the user may turn the mobile device off upon takeoff on a 10 hour flight, and then may turn the device back on 5 hours into the flight. When calculating the confidence value at block 210, the mobile device can identify the 10 hour flight duration evidenced by a stored electronic itinerary, and can determine that the time interval between the two changes of operation of the mobile device was only 5 hours. Thus, since it is unlikely that the trip has ended, the mobile device can calculate a low confidence value that does not exceed the threshold value. In this scenario, the mobile device can return to the stage of method 200 just prior to block 208, and await further changes in operation of the mobile device. If, at decision 212, the mobile device finds that the confidence value exceeds the threshold value, the mobile device can determine that the trip has ended, and thus that the destination location is the current location of the mobile device. If the mobile device makes such a determination, method 200 can proceed to block 214.

At block 214, the mobile device can configure one or more its settings based on the destination location identified at decision 212 as the current location. For instance, the mobile device can access the settings data table to determine the location-specific settings corresponding to the destination location. In some embodiments, these settings can include an identifier of the destination airport, a country code, a time zone, a communication standard (e.g., GSM, CDMA, etc.), allowed communication frequencies and power requirements for various network types (e.g., cellular, WiFi, BlueTooth, etc.), device capability restrictions (e.g., relating to GPS, integrated cameras, etc.), and the like. At block 214, the mobile device use these settings to configure the country code and time zone for the destination location, enable the appropriate communication standard (e.g., if the mobile device is configured for multiple standards), adjust communication frequency ranges and power output, and disable or enable device functionalities based on the requirements of the destination location.

At block 216, the mobile device can establish a network connection at the destination location using the configured one or more settings. For instance, the mobile device can scan for a network across the range of allowed frequencies and using the communication standard determined at block 214. By being aware of this information before seeking out the network, the time required for the mobile device to establish a connection and communicate with the network can be significantly reduced.

III. Levels of Confidence and Applications

The accuracy required for location determinations may vary depending on how the location is being used by the mobile device. Such requirements may vary due to differences in how processing efficiency, resource allocation, bandwidth usage, user privacy, and data accuracy are affected by an inaccurate location determination in different contexts. For instance, in the case of attempting to establish a network connection using settings for an incorrectly determined location, the process of connecting to the network can be lengthened due to the mobile device having to scan additional frequencies in an attempt to locate and connect to the network. In the case of applications that rely on location data provided by the mobile device, other issues may arise. For instance, if the mobile device were to pass an incorrect location to a map application, the user may be provided with inaccurate and potentially misleading information about their current location. Thus, the degree of accuracy desired in determining current location may not be universal across all possible utilizations of the location information.

In view of the above, in some embodiments, the confidence value calculated at block 210 of method 200 can be compared against multiple threshold values. Based on the comparisons, various levels of confidence can be determined by the mobile device which may in turn perform specific actions based on the determined confidence level. In the context of passing a determined location to an application, in some embodiments, the mobile device may perform a first routine if a first (e.g., "high") level of confidence is determined, a second routine if a second (e.g., "medium") level of confidence is determined, and a third routine if a third (e.g., "low") level of confidence is determined at block 210. Such embodiments are described below with respect to FIG. 3-5.

Figure 3:
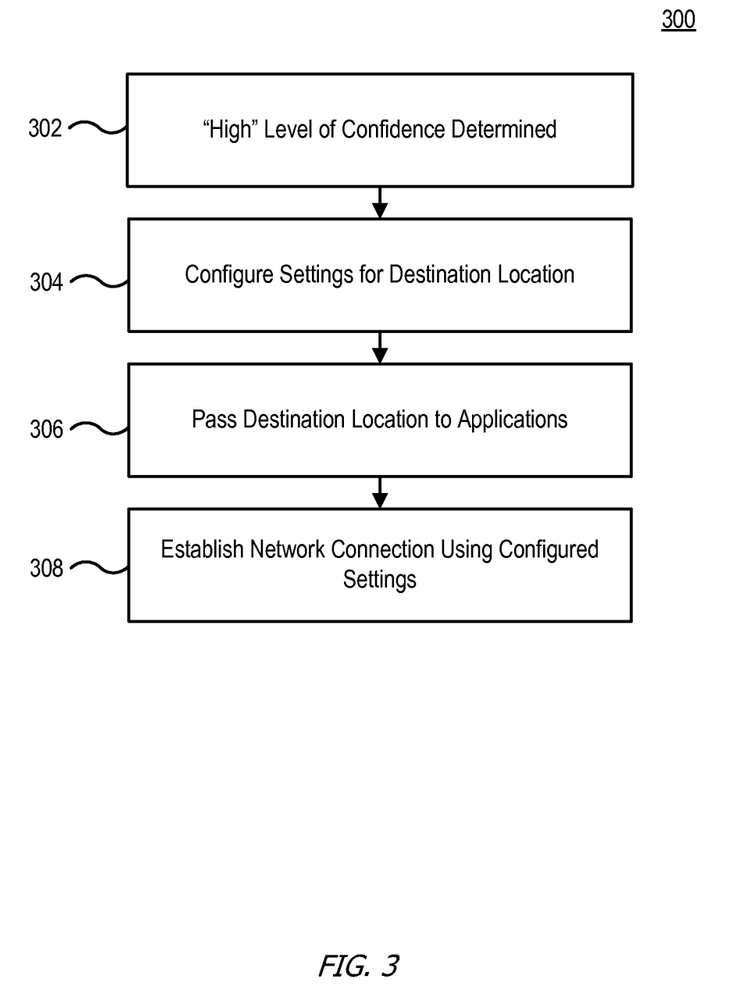
FIG. 3 is a flowchart illustrating a method 300 for establishing a network connection and passing a current location to an application according to an embodiment of the present invention.

FIG. 3 is a flowchart illustrating a method 300 for establishing a network connection and passing a current location to an application according to an embodiment of the present invention.

At block 302, the mobile device may associate a "high" level of confidence with a current location determined by the mobile device. For instance, referring back to method 200, the mobile device may determine at block 302 that the confidence value calculated at block 210 exceeds a high threshold value.

At block 304, the mobile device can configure one or more of its settings based on the determined current location. For instance, at block 304, the mobile device can perform the same or similar steps as those described above with respect to block 214 of FIG. 2.

At block 306, the mobile device can pass the current location to one or more applications running on the mobile device. Since the confidence level associated with the determined current location is high, the mobile device may pass the determined current location to the one or more applications before attempting to establish communication with the network and confirming the current location.

At block 308, the mobile device can establish the network connection using the settings configured at block 304. For instance, at block 308, the mobile device may perform the same or similar steps as those described above with respect to block 216 of FIG. 2. In embodiments of the invention, if the mobile device is unable to establish the network connection using the settings configured at block 304, other techniques may be used. For instance, as described below with respect to method 400 of FIG. 4, the mobile device can reconfigure its settings in accordance with a previously used network, or can scan increasingly broader ranges of wireless frequencies in an effort to locate a network. If the mobile device connects to a network and determines that the previously determined current location is inaccurate, the network can inform the mobile device of the correct current location which can then be passed by the mobile device to the one or more applications.

Figure 4:
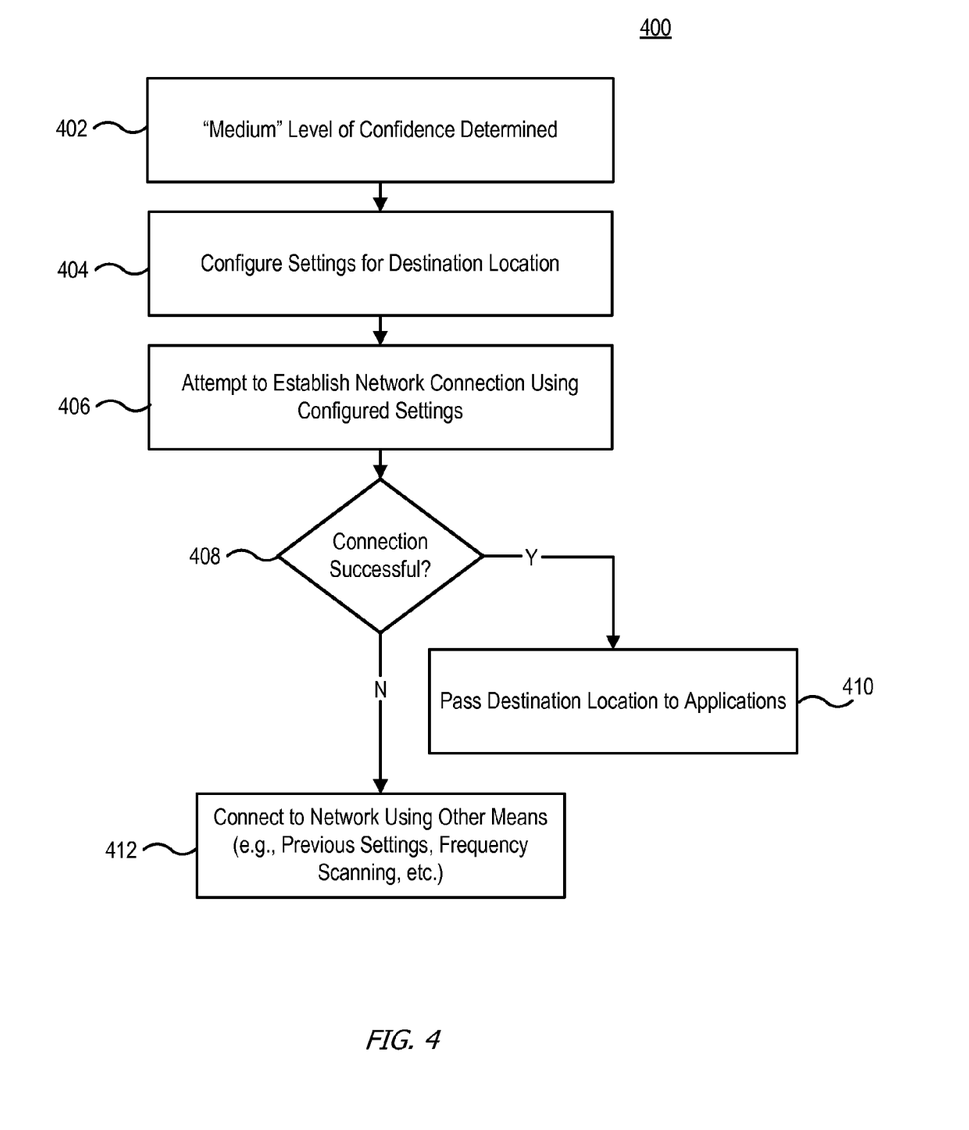
FIG. 4 is a flowchart illustrating a method 400 for establishing a network connection and passing a current location to an application according to an embodiment of the present invention.

FIG. 4 is a flowchart illustrating a method 400 for establishing a network connection and passing a current location to an application according to an embodiment of the present invention.

At block 402, the mobile device may associate a "medium" level of confidence with a current location determined by the mobile device. For instance, referring back to method 200, the mobile device may determine at block 402 that the confidence value calculated at block 210 exceeds a medium threshold value but not the high threshold value described above with respect to method 300.

At block 404, the mobile device can configure one or more of its settings based on the determined current location. For instance, at block 404, the mobile device may perform the same or similar steps as those described above with respect to block 214 of FIG. 2. Since the determined level of confidence is medium (i.e. lower than that calculated in method 300), the mobile device can attempt to establish a network communication to confirm the current location prior to passing the location to one or more applications running on the device. Thus, at block 406, the mobile device can attempt to establish a network connection using the settings configured at block 404. For instance, at block 406, the mobile device may perform the same or similar steps as those described above with respect to block 216 of FIG. 2.

At decision 408, the mobile device can determine whether connection with the network using the configured location-specific settings was successful, and thus whether the determined current location of the mobile device has been confirmed. If the network connection at location confirmation at decision 408 is successful, method 400 can proceed to block 410. With confirmation of the current location, at block 410, the mobile device can pass the current location to the one or more application running on the mobile device. If, however, the network connection was unsuccessful at decision 408 and thus the determined location unconfirmed, method 400 can proceed to block 412.

At block 412, the mobile device can attempt to connect to the network using other means. For instance, in some embodiments, the mobile device can configure its settings in accordance with a previously used network (e.g., the last used network, the most commonly used network, etc.). If the mobile device is unable to locate and connect to a network using the previous settings, the mobile device may scan increasingly broader ranges of wireless frequencies in an effort to locate a network. If a network is found and a connection established, the mobile device can determine its location from the network, and can pass the location to the one or more applications running on the mobile device.

Figure 5:
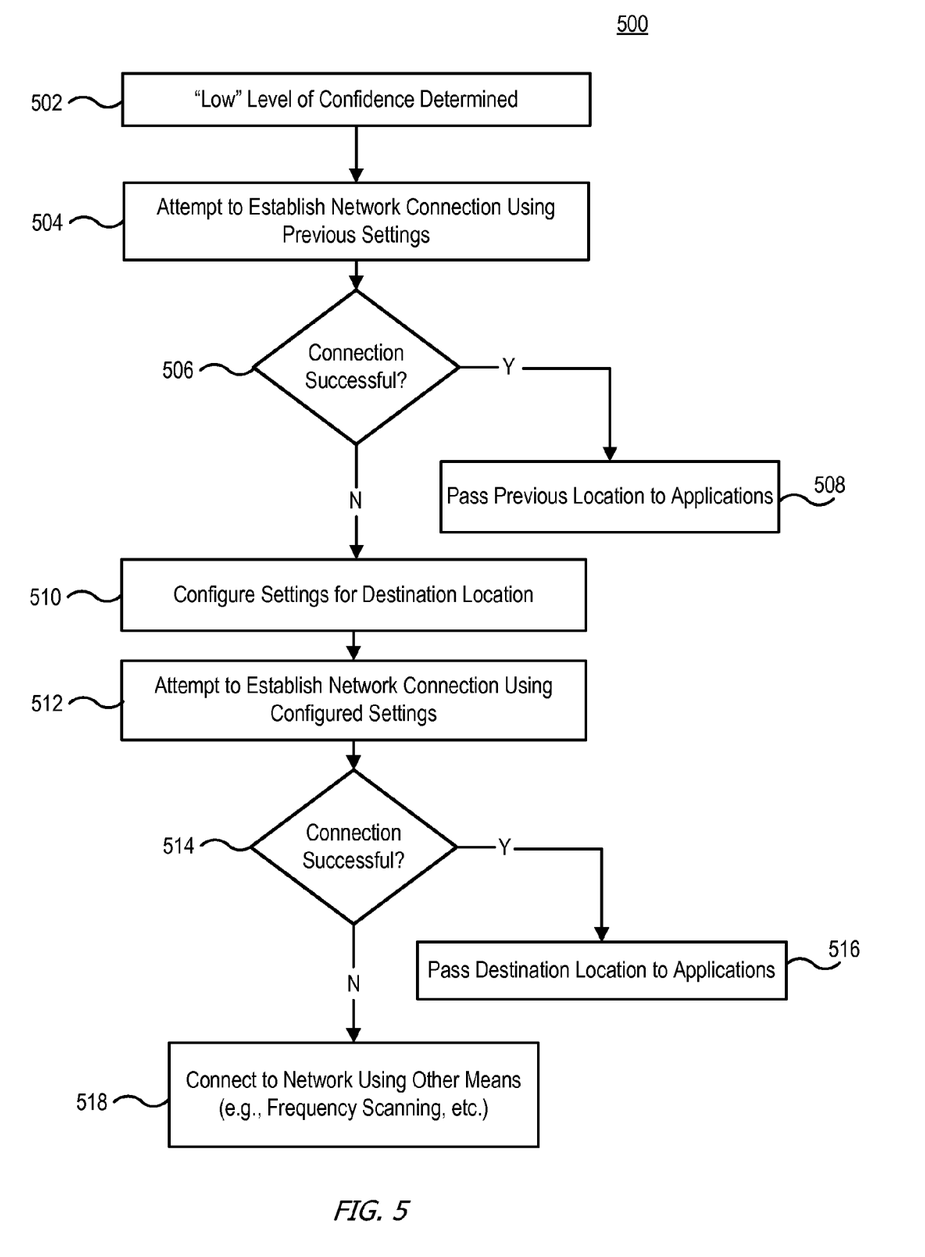
FIG. 5 is a flowchart illustrating a method 500 for establishing a network connection and passing a current location to an application according to an embodiment of the present invention.

FIG. 5 is a flowchart illustrating a method 500 for establishing a network connection and passing a current location to an application according to an embodiment of the present invention.

At block 502, the mobile device may associate a "low" level of confidence with a current location determined by the mobile device. For instance, referring back to method 200, the mobile device may determine at block 502 that the confidence value calculated at block 210 exceeds a low threshold value but does not exceed the high threshold value described above with respect to method 300 or the medium threshold value described above with respect to method 400.

At block 504, since the mobile device has a low level of confidence in the determined current location, the mobile device can attempt to establish a network connection with settings used to access a previous network (e.g., the last used network, the most commonly used network, etc.).

At decision 506, the mobile device can determine whether connection with a network using the previous settings was successful, and thus whether the current location of the mobile device is the previous location associated with the previously accessed network. If the network connection at decision 506 is successful, the method 500 can proceed to block 508. Thus, at block 508, the mobile device can pass the previous location (i.e. the newly determined current location) to one or more applications running on the mobile device. If, however, the network connection was unsuccessful at decision 506, method 500 can proceed to block 510.

At block 510, the mobile device can configure one or more of its settings based on the destination location (i.e. the determined location associated with the low confidence value). For instance, at block 510, the mobile device can perform the same or similar steps as those described above with respect to block 214 of FIG. 2. At block 512, the mobile device can attempt to establish a network connection using the settings configured at block 510. For instance, at block 512, the mobile device can perform the same or similar steps as those described with respect to block 216 of FIG. 2.

At decision 514, the mobile device can determine whether connection with a network using the destination location settings was successful, and thus whether the current location has been confirmed as the destination location. If the network connection and location confirmation at decision 514 is successful, method 500 can proceed to block 516. At block 516, the mobile device can pass the determined current location (i.e. the destination location) to the one or more applications running on the mobile device. If, however, the network connection at decision 514 is unsuccessful, method 500 can proceed to block 518.

At block 518, the mobile device can attempt to connect to a network using other means. For instance, the mobile device may scan increasingly broader ranges of wireless frequencies in an effort to locate a network. If a network is found and a connection established, the mobile device can determine its location from the network, and can pass the location to the one or more applications running on the mobile device.

In some embodiments, location passing routines may vary for individual applications depending on calculated confidence values, as the accuracy of location information may be more important to one application than another. For instance, in some embodiments, a determined location may be passed to a $1^{st}$ party (i.e. native) application while not being passed to a $3^{rd}$ party application depending on the determined confidence value.

Further, in some embodiments, the mobile device can perform additional tasks upon analyzing indicia of a trip by a user. For instance, the mobile device may detect when a user boards an airplane (e.g., via GPS data). If the boarding date, time, and location matches stored indicia of a trip by the user (e.g, an electronic itinerary, ticket, calendar entry, etc.), the mobile device can automatically change its operation in response to the user boarding the airplane. For instance, the mobile device can automatically turn itself off or turn off connectivity at the network interface. In some embodiments, accelerometer or barometer data may also be used to determine that the user is on a flight about to takeoff, and thus the power or network connectivity can be automatically turned off by the mobile device. Similarly, upon landing, the mobile device can turn the mobile device or network connectivity back on automatically upon detecting accelerometer or barometer data which suggests that the airplane has landed at its destination.

V. Mobile Device

Figure 6:
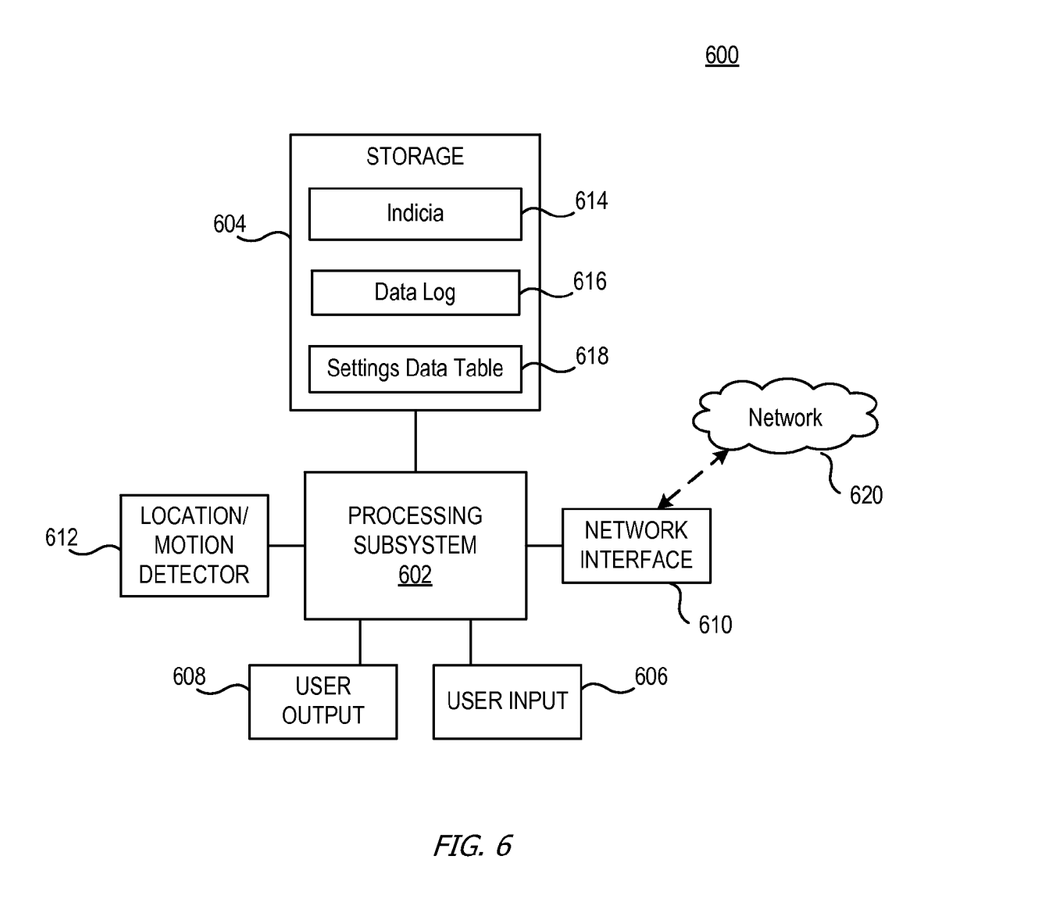
FIG. 6 is a simplified block diagram of an implementation of a mobile device 600 according to embodiments of the present invention.

FIG. 6 is a simplified block diagram of an implementation of a mobile device 600 according to an embodiment of the present invention. Mobile device 600 can be a handheld device, a notebook computer, or any suitable electronic device capable of communicating with a network 620. Mobile device 600 can include a processing subsystem 602, a storage subsystem 604, a user input device 606, a user output device 608, a network interface 610, and a location/motion detector 612.

Processing subsystem 602, which can be implemented as one or more integrated circuits (e.g., e.g., one or more single-core or multi-core microprocessors or microcontrollers), can control the operation of mobile device 600. In various embodiments, processing subsystem 602 can execute a variety of programs in response to program code and can maintain multiple concurrently executing programs or processes. At any given time, some or all of the program code to be executed can be resident in processing subsystem 602 and/or in storage subsystem 604.

Through suitable programming, processing subsystem 602 can provide various functionality for mobile device 600. For example, processing subsystem 602 can execute an application that can perform all or parts of methods described herein, such as configuring one or more settings of mobile device 600 based on an inferred location.

Storage subsystem 604 can be implemented, e.g., using disk, flash memory, or any other storage media in any combination, and can include volatile and/or non-volatile storage as desired. In some embodiments, storage subsystem 604 can store one or more application programs to be executed by processing subsystem 602. In some embodiments, storage subsystem 604 can store other data such as indicia 614 of a trip by the user, a data log 616, and a settings data table, 618 each of which is described in detail above. Programs and/or data can be stored in non-volatile storage and copied in whole or in part to volatile working memory during program execution.

A user interface can be provided by one or more user input devices 606 and one or more user output devices 608. User input devices 606 can include a touch pad, touch screen, scroll wheel, click wheel, dial, button, switch, keypad, microphone, or the like. User output devices 608 can include a video screen, indicator lights, speakers, headphone jacks, or the like, together with supporting electronics (e.g., digital-to-analog or analog-to-digital converters, signal processors, or the like). A user can operate input devices 606 to invoke the functionality of mobile device 600 and can view and/or hear output from mobile device 600 via output devices 608.

Network interface 610 can provide voice and/or data communication capability for mobile device 600. For instance, network interface 610 can provide mobile device 600 with the capability of communicating with network 620. In some embodiments network interface 610 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), and/or other components. In some embodiments network interface 610 can provide wired network connectivity (e.g., Ethernet) in addition to or instead of a wireless interface. Network interface 610 can be implemented using a combination of hardware (e.g., antennas, modulators/demodulators, encoders/decoders, and other analog and/or digital signal processing circuits) and software components.

Location/motion detector 612 can detect a past, current or future location of mobile device 600 and/or a past, current or future motion of mobile device 600. For instance, location/motion detector 612 can detect a velocity, acceleration, or altitude of mobile device 600. Location/motion detector 612 can comprise a Global Positioning Satellite (GPS) receiver and/or an accelerometer. In some instances, processing subsystem 602 determines a motion characteristic of mobile device 600 (e.g., velocity) based on data collected by location/motion detector 612. For example, a velocity can be estimated by determining a distance between two detected locations and dividing the distance by a time difference between the detections. In some embodiments, location/motion detector 612 can collect barometric pressure data.

It will be appreciated that mobile device 600 described herein is illustrative and that variations and modifications are possible. A mobile device can have other capabilities not specifically described herein (e.g., telephonic capabilities, power management, accessory connectivity, etc.). In a system with multiple mobile devices 600, different mobile devices 600 can have different sets of capabilities; the various mobile devices 600 can be but need not be similar or identical to each other.

Further, while mobile device 600 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while mobile device 600 is described as a singular entity, it is to be understood that it can include multiple coupled entities. For instance, mobile device 600 can include a device and/or a set of coupled devices.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of standards, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method for configuring one or more settings of a mobile device of a user based on an inferred location, the method comprising:
    analyzing, with the mobile device, data stored in a storage of the mobile device to identify indicia of an origination location and a destination location of a trip by the user;
    inferring a start of the trip at the origination location based on a first change in operation of the mobile device, wherein the mobile device includes a network interface, and wherein the first change in operation involves a change in connectivity at the network interface;
    inferring an end of the trip at the destination location based on a second change in operation of the mobile device;
    after inferring the end of the trip, identifying the destination location as a current location of the mobile device;
    configuring the one or more settings of the mobile device based on the identified current location, wherein configuring the one or more settings of the mobile device comprises:
        accessing a data table stored in the storage of the mobile device, wherein the data table includes a plurality of locations and one or more settings for each of the plurality of locations;
        retrieving the one or more settings for the identified current location from the data table; and
        using the one or more settings retrieved from the data table to configure the one or more settings of the mobile device; and
    using the one or more configured settings to establish a network connection.

2. The method of claim 1, wherein the indicia is included in one or more of: an electronic ticket, an electronic itinerary, a calendar entry, a text message, and an e-mail message.

3. The method of claim 1, wherein inferring the end of the trip comprises:
    determining, by a processor of the mobile device, a confidence value for the current location;
    comparing the confidence value against a threshold value; and
    determining that the confidence value exceeds the threshold value.

4. The method of claim 3, wherein the indicia includes a time interval associated with the trip, and wherein determining the confidence value for the current location comprises:
    calculating, by the processor of the mobile device, a time interval that elapsed between the first change in operation and the second change in operation of the mobile device;
    comparing the elapsed time interval with the time interval associated with the trip; and
    determining that the elapsed time interval is consistent with the time interval associated with the trip.

5. The method of claim 3, wherein the determined confidence value is based on the source of the indicia.

6. The method of claim 1, wherein the one or more configured settings include a range of frequencies, and wherein using the one or more configured settings to establish a network connection comprises:
    scanning the range of frequencies to identify a network.

7. The method of claim 1, wherein configuring the one or more settings of the mobile device further comprises:
    determining a time zone corresponding to the identified current location; and
    setting the time zone as the current time zone on the mobile device.

8. The method of claim 1, wherein the change in connectivity at the network interface is a first change in connectivity, and wherein the second change in operation of the mobile device is a second change in connectivity at the network interface.

9. The method of claim 1, wherein the network connection is established using the network interface.

10. The method of claim 1, further comprising:
    passing the current location to an application running on the mobile device.

11. A computer program product comprising a non-transitory computer readable medium storing a plurality of instruction that when executed control a processor to configure one or more settings based on an inferred location, the instructions comprising:

analyzing data stored in a storage of a mobile device to identify indicia of an origination location and a destination location of a trip by a user;

inferring a start of the trip at the origination location based on a first change in operation of the mobile device, wherein the first change in operation involves a change in connectivity at a network interface of the mobile device;

inferring an end of the trip at the destination location based on a second change in operation of the mobile device;

after inferring the end of the trip, identifying the destination location as a current location of the mobile device;

configuring the one or more settings of the mobile device based on the identified current location, wherein configuring the one or more settings of the mobile device comprises:

accessing a data table stored in the storage of the mobile device, wherein the data table includes a plurality of locations and one or more settings for each of the plurality of locations;

retrieving the one or more settings for the identified current location from the data table; and using the one or more settings retrieved from the data table to configure the one or more settings of the mobile device; and using the one or more configured settings to establish a network connection.

12. The computer program product of claim 11, wherein inferring the end of the trip comprises:

determining, by a processor of the mobile device, a confidence value for the current location;

comparing the confidence value against a threshold value; and determining that the confidence value exceeds the threshold value.

13. The computer program product of claim 12, wherein the indicia includes a time interval associated with the trip, and wherein determining the confidence value comprises:

calculating, by the processor of the mobile device, a time interval that elapsed between the first change in operation and the second change in operation of the mobile device;

comparing the elapsed time interval with the time interval associated with the trip; and determining that the elapsed time interval is consistent with the time interval associated with the trip.

14. The computer program product of claim 12, wherein the determined confidence value is based on the source of the indicia.

15. The computer program product of claim 11, wherein the one or more configured settings include a range of frequencies, and wherein using the one or more configured settings to establish a network connection comprises:

scanning the range of frequencies to identify a network.

16. The computer program product of claim 11, wherein configuring the one or more settings of the mobile device further comprises:

determining a time zone corresponding to the identified current location; and setting the time zone as the current time zone on the mobile device.

17. The computer program product of claim 11, wherein the change in connectivity at the network interface is a first change in connectivity, and wherein the second change in operation of the mobile device is a second change in connectivity at the network interface.

18. The computer program product of claim 11, wherein the instructions further comprise:

passing the current location to an application running on the mobile device.

19. A mobile device for configuring one or more settings based on an inferred location, the mobile device comprising:

a storage subsystem that stores indicia of an origination location and a destination location of a trip by a user;

a network interface; and a processing subsystem configured to:

analyze the stored indicia;

infer a start of the trip at the origination location based on a first change in operation of the mobile device, wherein the first change in operation involves a change in connectivity at the network interface;

infer an end of the trip at the destination location based on a second change in operation of the mobile device;

after inferring the end of the trip, identify the destination location as a current location of the mobile device;

configure the one or more settings of the mobile device based on the identified current location, wherein configuring the one or more settings of the mobile device comprises:

accessing a data table stored in the storage subsystem of the mobile device, wherein the data table includes a plurality of locations and one or more settings for each of the plurality of locations;

retrieving the one or more settings for the identified current location from the data table; and using the one or more settings retrieved from the data table to configure the one or more settings of the mobile device; and use the one or more configured settings to establish a network connection via the network interface.

20. The mobile device of claim 19, wherein the processing subsystem is further configured to:

determine a confidence value for the current location;

compare the confidence value against a threshold value; and determine that the confidence value exceeds the threshold value.

21. The mobile device of claim 20 further comprising a location/motion detector, wherein determining the confidence value further comprises analyzing one or more of: accelerometer data, altimeter data, and barometric data generated by the location/motion detector and stored in the storage subsystem.

* * * * *